United States Patent [19]
Yeske

[11] 3,903,983
[45] Sept. 9, 1975

[54] STEERING SYSTEM FOR VEHICLES

[75] Inventor: Laurel R. Yeske, Burlington, Wis.

[73] Assignee: J. I. Case Company, Racine, Wis.

[22] Filed: Dec. 29, 1972

[21] Appl. No.: 319,546

[52] U.S. Cl. .............................. 180/79.2 C; 280/91
[51] Int. Cl.² ........................ B62D 5/06; B62D 7/16
[58] Field of Search .................. 180/6.4, 46, 79.2 C; 280/91

[56] References Cited
UNITED STATES PATENTS

| | | | |
|---|---|---|---|
| 2,001,647 | 5/1935 | Alt | 280/91 |
| 2,783,849 | 3/1957 | Armington et al. | 180/79.2 C |
| 3,075,784 | 1/1963 | Beyerstedt | 280/91 |
| 3,092,201 | 6/1963 | Biek | 180/79.2 C |
| 3,202,238 | 8/1965 | Strader | 180/79.2 C |
| 3,305,041 | 2/1967 | Schramm | 180/79.2 C |
| 3,482,643 | 12/1969 | Ivy | 180/79.2 C |
| 3,596,730 | 8/1971 | Cecce | 280/91 X |

FOREIGN PATENTS OR APPLICATIONS 494,729   10/1938   United Kingdom ................ 280/91

*Primary Examiner*—Robert J. Spar
*Assistant Examiner*—Leslie J. Paperner
*Attorney, Agent, or Firm*—Dressler, Goldsmith, Clement & Gordon, Ltd.

[57] ABSTRACT

A steering system is disclosed in this application wherein the rear wheels can be manually controlled by the operator or automatically controlled by the condition of the front wheels in various modes of operation. In the manual mode of operation, the rear wheels can be set at a desired angular position by a manual control lever and the system has an automatic follow up means that will condition the rear wheels to the setting of the control lever. In the automatic mode of operation, the control lever is operatively connected to the front wheels in any one of several modes of operation so that the rear wheels are automatically set to a position corresponding with the position of the front wheels.

12 Claims, 16 Drawing Figures

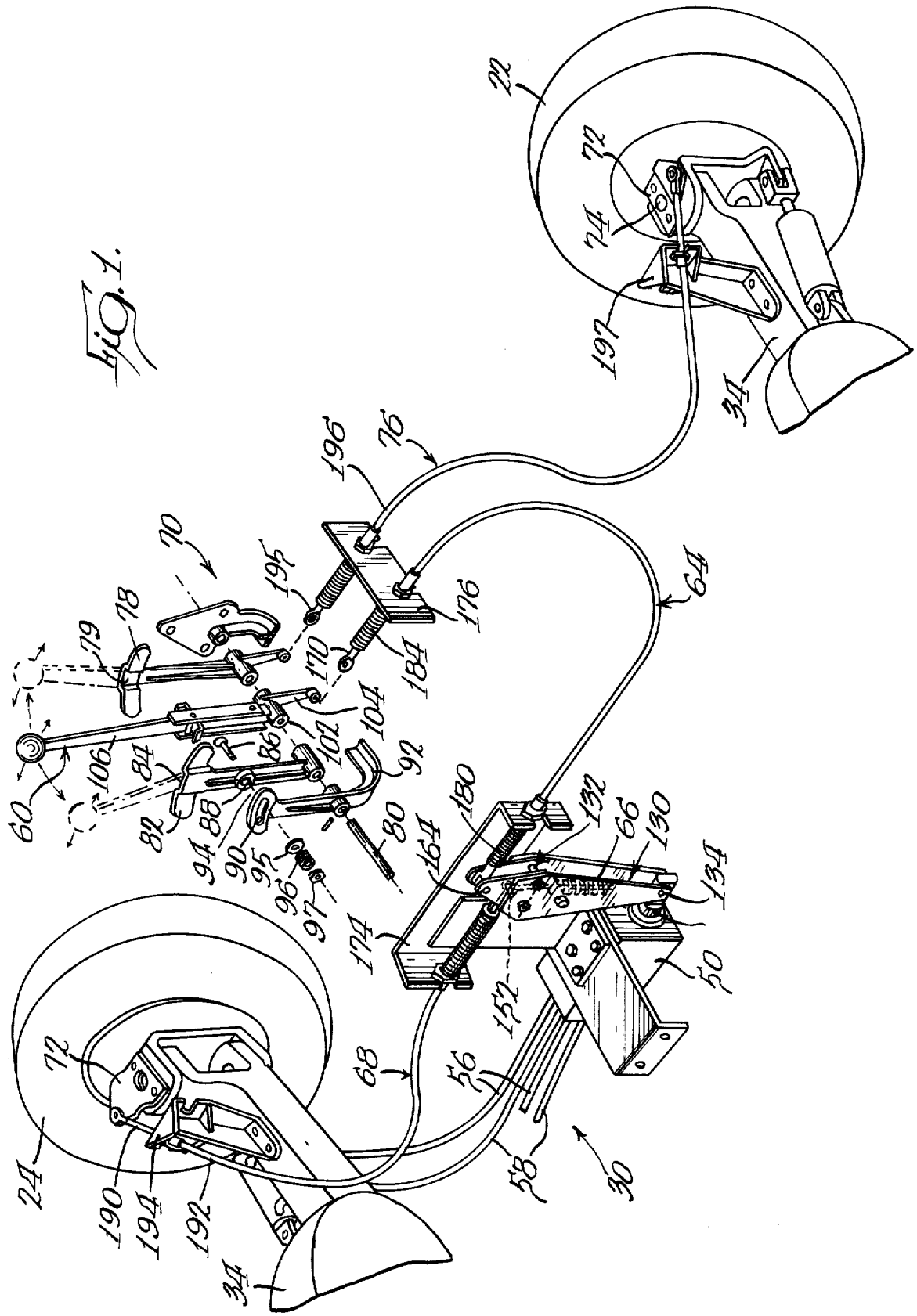

FORWARD LEFT

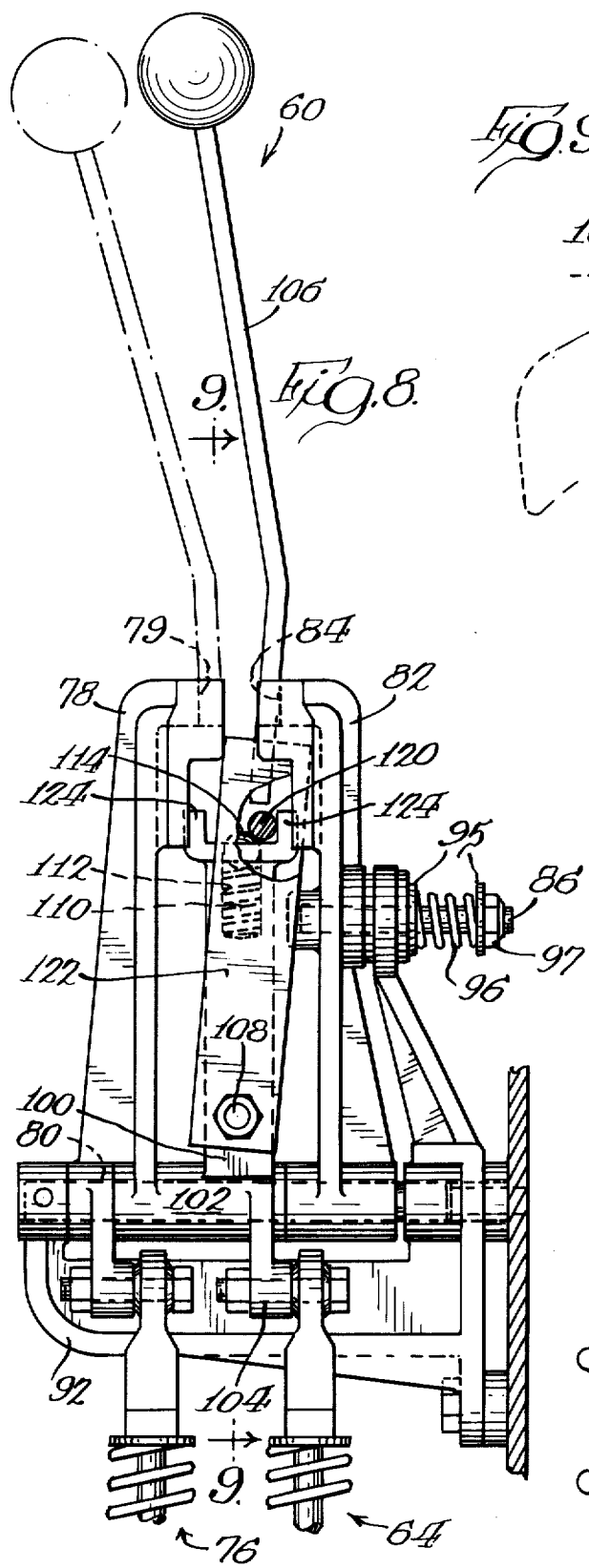
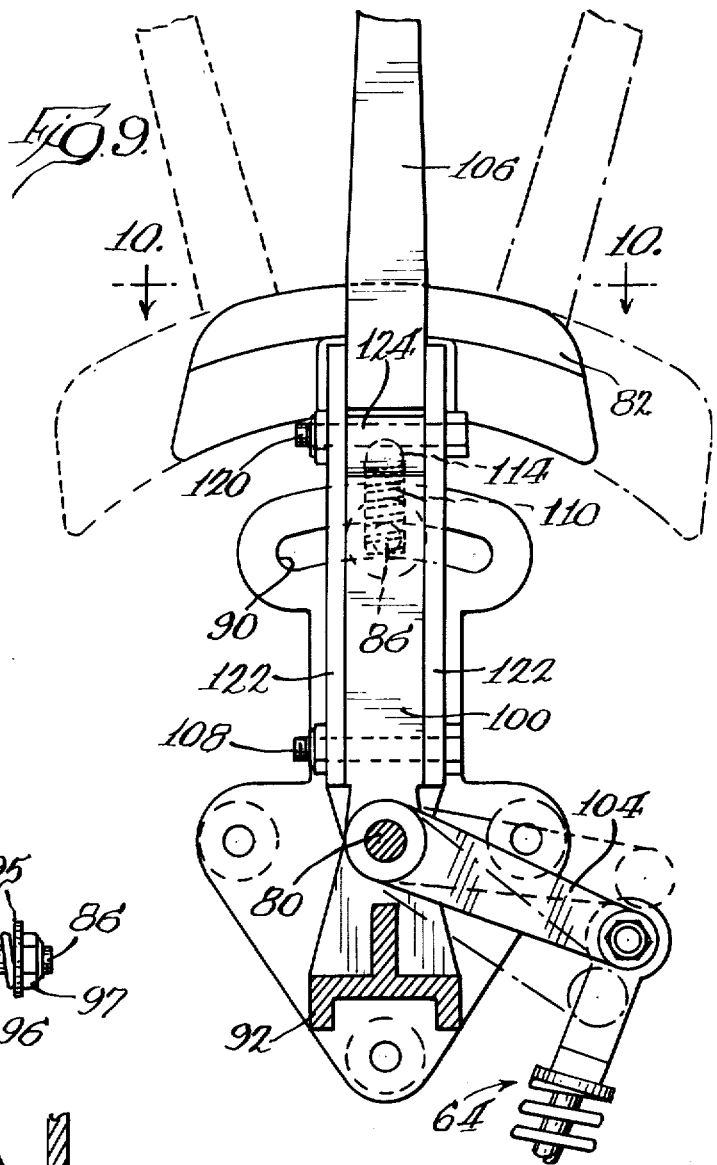
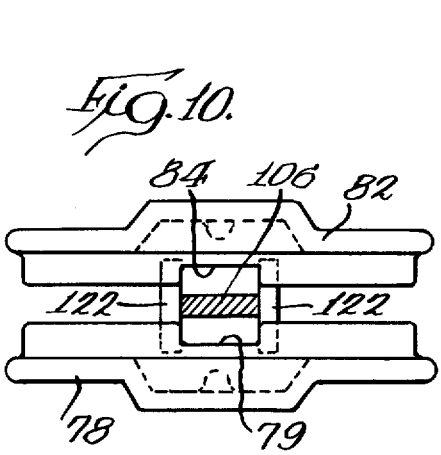

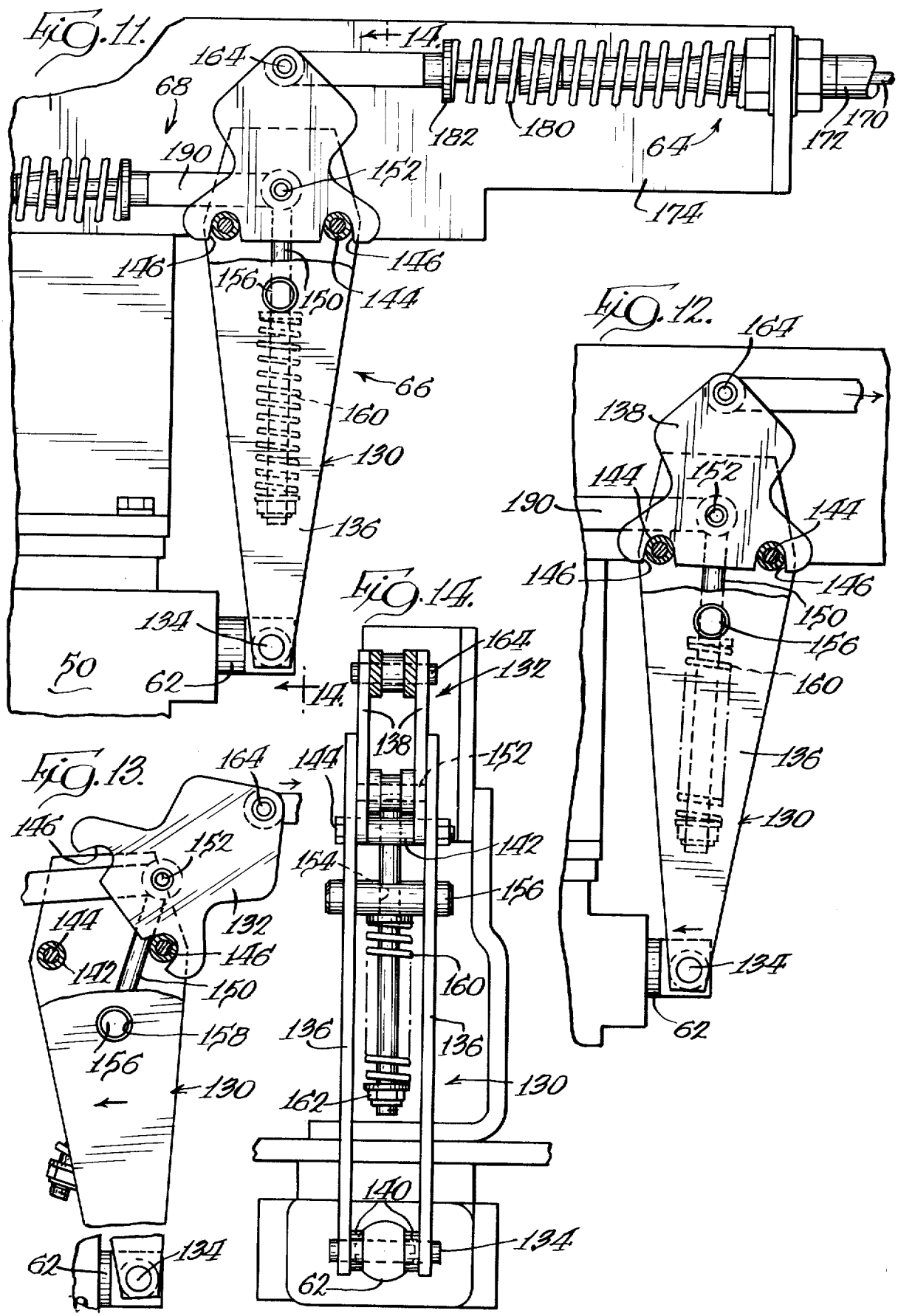

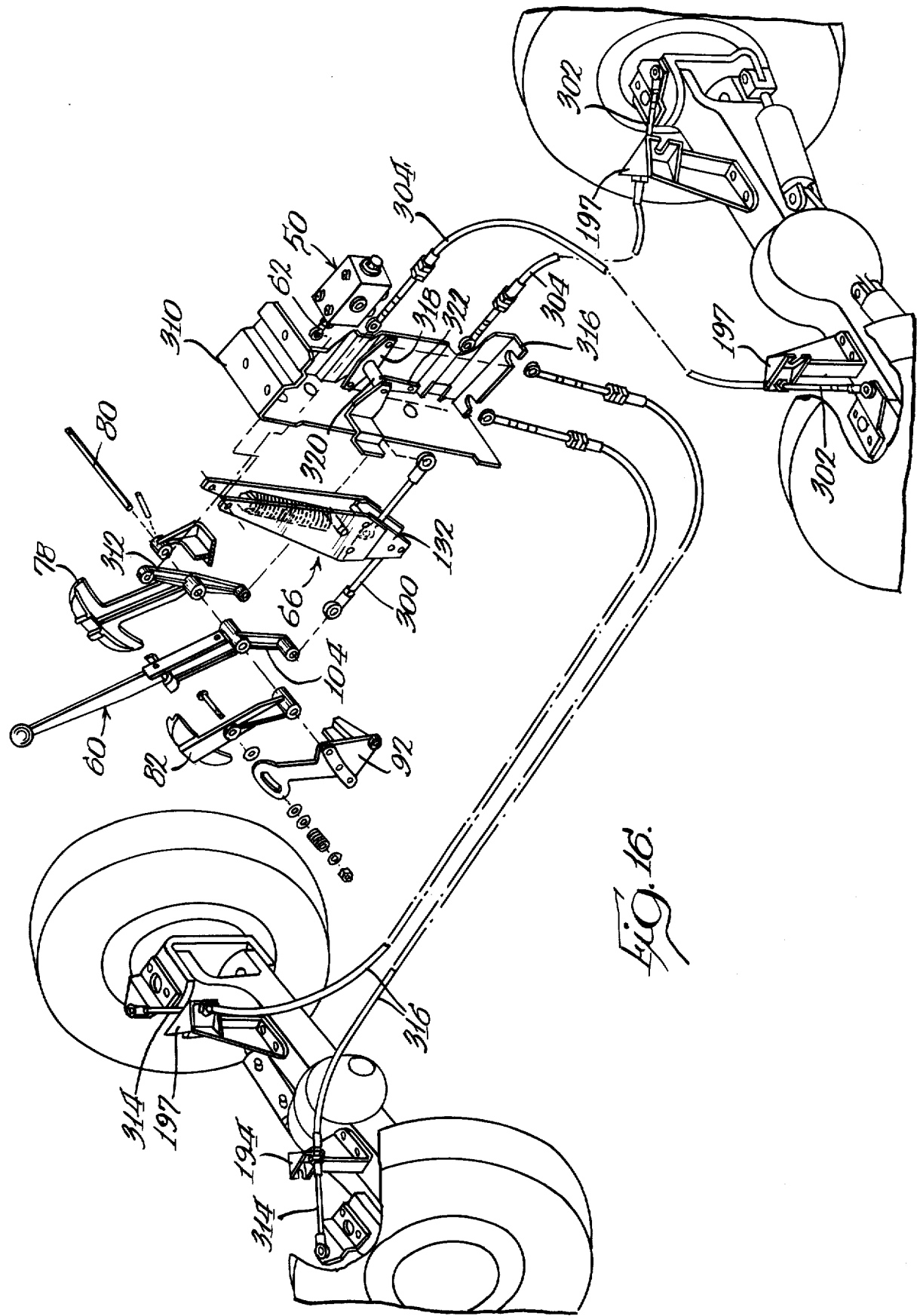

STEERING SYSTEM FOR VEHICLES

BACKGROUND OF THE INVENTION

This invention relates to a four-wheel steering control system and more particularly to a four-wheel steering system in which the rear wheels can be automatically controlled as a function of the front wheels or manually controlled according to the wishes of the operator.

In recent years, considerable emphasis has been placed on increasing the versatility of numerous types of self-propelled vehicles. One area that has received a considerable amount of attention is the steering system for such vehicles. In many instances, vehicles of this type are designed for operation with their front and rear wheels arranged for three different modes of operation. The first mode may be referred to as the neutral mode in which the rear wheels are passively controlled or are positioned so that they extend generally parallel to the longitudinal axis of the vehicle and the vehicle is controlled by the front wheels only. In a second condition, sometimes referred to as cramp steering, the rear wheels are disposed relative to the longitudinal vehicle axis at an angle equal to but opposite to the angular disposition of the associated front wheels. In a third condition, referred to as crab steering, the front wheels and rear wheels are disposed relative to the longitudinal vehicle axis at equal angles but in the same direction.

Many types of steering systems have been proposed wherein the three modes of operation discussed above can be selected. However, none of the systems heretofore proposed allow for a manual control in addition to the automatic control for the rear wheels of the vehicle. It has been found that in many times it may be desirable to be able to manually control the rear wheels of a vehicle when the vehicle is being operated in crowded areas.

SUMMARY OF THE INVENTION

The present invention contemplates a steering mechanism for a four-wheeled vehicle in which the front wheels are controlled through the normal steering wheel while the rear wheels are controlled through a separate steering system that can be manually actuated or operatively coupled to the front wheel steering system to be responsive to the turning movement of the front wheels in any one of several modes of operation.

The rear steering system includes control means for controlling the turning movement of the rear wheels and a manual lever for setting the position of the control means with the manual lever being capable of being operatively coupled to the front wheels to automatically position the rear wheels as a function of the position of the front wheels.

More specifically, the rear steering control means consists of a valve having a valve spool moveable in opposite directions from a neutral position with a manual control lever operatively connected to the valve spool and follow-up means between the rear wheels and the valve spool for moving the valve spool to the neutral position when the rear wheels are in a position corresponding to the setting of the lever.

The manual control lever is positioned in the operator's compartment of the vehicle and is connected to the control valve spool through linkage means that also forms part of the follow-up means. The linkage means consists of a link that has one end pivotally connected to the valve spool and the opposite end connected to the control lever through connecting means while an intermediate portion of the link is pivoted on the follow-up means.

The steering system also includes hydraulic control means having a steering wheel incorporated therein for positioning the front wheels and the front wheels are operatively connected to the control lever through a further linkage.

In one specific embodiment of the invention, the linkage between the control valve spool and the lever and also the linkage between the lever and the front wheel consists of separate flexible cables that are constantly maintained in tension so that a single cable may be used for transmitting the motions. In this embodiment, the follow-up means also consists of a flexible cable that is constantly maintained under tension and has one end connected to the link pivoted on the valve spool and the opposite end connected to the rear wheel.

In an alternate embodiment, a pair of flexible cables are interposed between the respective front wheels and the control lever so that turning movement of the wheels in one direction will be transmitted to the lever by one cable while the turning movement in the opposite direction will be transmitted to the lever by the other cable. In this embodiment, the follow-up means also consists of a pair of cables respectively connected to the rear wheels and operatively connected to the control valve so that turning movements of the rear wheel in opposite directions are transmitted through the respective cables.

In both embodiments of the invention, the linkage means incorporates a first control device that is pivoted on a fixed pivot common with the pivot for the control lever and a second control device pivoted on the fixed pivot on the opposite side of the lever with the lever having first and second positions for conjunctive movement with either of the control devices. The first control device is connected to the front wheel or wheels through the cable or cables while the second control device incorporates friction means to hold the lever in a manually adjusted position.

In the operation of the device so far described, the control lever can be pivoted to a first position engaging the first control device so that any turning movement of the front wheels through the manual steering wheel will automatically be transmitted through the linkage means including the control lever to the control valve co-operating with the rear wheels to adjust the position of the rear wheels.

According to a further aspect of the invention, the lever can be coupled to the first control device to either condition the rear wheels for crab or cramp steering through the manipulation of the front steering wheel.

According to a further aspect of the invention, the control lever includes a first portion pivoted about a fixed axis between the control devices with a second portion pivotally interconnected to the first portion about a pivot axis extending perpendicular to the axis of the shaft with retention means for normally maintaining the two portions in first and second positions relative to each other where the second portion is in engagement with the respective devices.

According to a still further aspect of the invention, the link cooperating with the control valve in the rear steering system is capable of accommodating relative movement between the valve spool and the follow-up means or the control lever when the valve is in an extreme position and additional movement of either the follow-up means or the lever is produced. For this purpose, the link consists of first and second elements, one of which has first and second transversely spaced pivot pins adjacent one end while the other element has first and second pivot axes defined thereon and the two elements are biased towards each other by biasing means to normally maintain the pivot axes in engagement with the pivot pins. However, should an abnormal force be applied to either of the elements, which is greater than the force of the biasing means, the biasing means will accommodate the pivotal movement of the elements relative to each other about one of the pivot pins.

BRIEF DESCRIPTION OF THE SEVERAL VIEWS OF THE DRAWINGS

FIG. 1 is a fragmentary perspective view of the steering system of the present invention with a portion of the system shown in exploded view for purposes of clarity;

FIG. 8 is an enlarged fragmentary plan view of the control lever;

FIG. 9 is a vertical section of the control lever as viewed along line 9—9 of FIG. 8;

FIG. 10 is an enlarged section as viewed generally along line 10—10 of FIG. 9;

FIG. 11 is a fragmentary side elevational view of the linkage means adjacent the control valve for the rear steering system;

FIG. 12 is a view similar to FIG. 11 with certain parts thereof broken away to show the details of the linkage;

FIG. 13 is a fragmentary view similar to FIG. 12 showing the two elements of the link in a second position;

FIG. 14 is a vertical section taken generally along line 14—14 of FIG. 11;

FIG. 16 is a fragmentary perspective view similar to FIG. 1 showing a slightly modified form of steering system.

DETAILED DESCRIPTION

Figure 15:
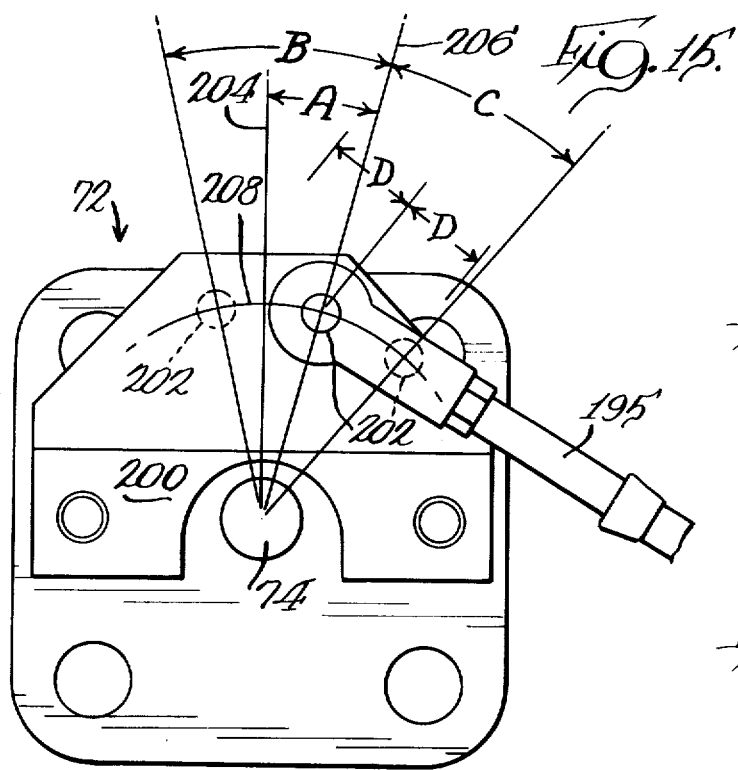
FIG. 15 is a fragmentary plan view of a connection between the front wheel and the linkage means of the steering system.
Figure 3:
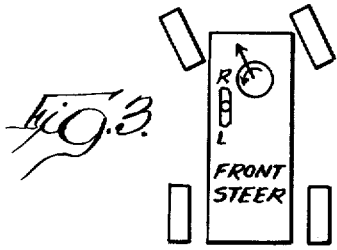
FIGS. 3 through 7 show the steering system for various modes of operation.

While the present invention is susceptible of embodiment in many different forms, there is shown in the drawings and will be herein described in detail several preferred embodiments of the invention and modifications thereof, with the understanding that the present disclosure is to be considered as an exemplification of the principles of the invention and is not intended to limit the invention to the embodiments illustrated.

Figure 2:
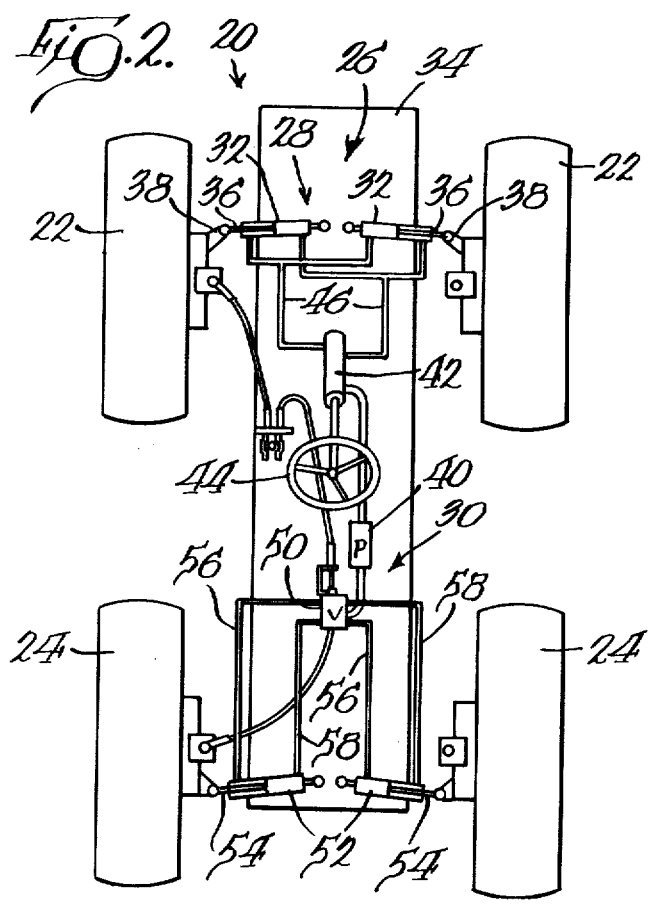
FIG. 2 is a schematic illustration of the vehicle and the overall hydraulic system for the front and rear steering.

FIG. 2 of the drawings shows a vehicle generally designated by the reference numeral 20 having a pair of front wheels 22 and a pair of rear wheels 24. The front and rear wheels are controlled by a hydraulic steering system generally designated by the reference numeral 26. Hydraulic steering system 26 consists of first or front steering means 28 for controlling the turning movement of the front or first pair of wheels 22 and second or rear steering means 30 for controlling the turning movement of the rear or second pair of wheels 24.

Front steering means 28 includes a pair of cylinders 32 respectively pivotally supported on vehicle frame 34 with piston rods 36 slidable in cylinders 32 and pivotally connected to the wheels 22 through brackets 38. Fluid is supplied to opposite ends of the cylinders 32 from a pump 40 through a control valve 42, the position of which is controlled by a conventional steering wheel 44 for the vehicle. The hydraulic fluid from pump 40 is directed through conduits 46 to opposite ends of the respective cylinders 32.

The rear steering means or control means 30 for controlling the turning movement of the rear wheels consists of a control member or valve 50 that has hydraulic fluid supplied thereto from pump 40 and directs the fluid to a pair of cylinders 52 pivoted on the vehicle frame 34. A pair of piston rods 54 are reciprocated in the cylinders 52 and connected to the rear wheels 24. Hydraulic fluid from valve 50 is directed through first and second sets of conduits 56 and 58 and actuation of the control valve or member 50 will connect one set of conduits to the pump while the other set is connected to the reservoir (not shown).

According to the present invention, the rear steering system also incorporates a manual control lever 60 (FIG. 1) that is coupled to valve spool 62 of control valve or member 50 through linkage means that include a flexible link 64 and a compound link 66, the details of which will be described later. Rear steering means 30 also incorporates follow-up means 68 coupled to valve spool 62 through link 66, as will be described in more detail later.

According to the primary aspect of the present invention, the rear steering system 30 is capable of being manually controlled through the lever 60 or automatically controlled through the turning movement of the front wheels through coupling means 70 that cooperate with the front wheels and are selectively engageable with the lever for actuating the control valve or member as a function of the turning movement of the front wheels.

The coupling means 70 includes a motion transmitting means 72 that is carried by a vertical pivot pin 74 which supports left front wheel 22 for pivotal movement on the frame 34. The motion transmitting means or member 72 is coupled to the control lever 60 through a signal transmitting member or means 76 connected to a control device 78 that is pivotally supported on a fixed pivot pin 80 adjacent one side of control lever 60.

The friction means for holding control lever 60 in any desired set position consists of a second control device 82 (FIG. 1) that is also pivoted about a fixed pivot axis defined by shaft 80 and is located on the opposite side of control lever 60. The second control device has friction means cooperating therewith for maintaining the lever and second control device in adjusted positions or maintain a fixed setting for manual control lever 60. The friction means is most clearly shown in FIG. 1 and consists of a bolt 86 extending through an opening 88 in second control device 82 and also through an arcuate slot 90 in support bracket 92. A friction disk 94 is interposed between support bracket 92 and second control device 82 while a washer 95 and spring 96, are located over the bolt 86 and a nut 97 is threaded on the bolt. Thus, by tightening of the nut, the desired amount of frictional drag may be set for second control device 82.

With the arrangement so far described, the rear wheels may be manually controlled by engaging notch 84 of control device 82 with lever 60. Manual control lever may then be pivoted about its fixed pivot axis defined by pin 80 in opposite directions to pivot link 66 about a pivotal connection defined by follow-up means 68 and move valve spool 62 for turning the rear wheels. When the desired setting has been reached by the manual control lever, the manual control lever will be held in this position, by the friction means cooperating with control device 82 and the end of flexible link 64 will act as a pivot for link 66. The turning movement of rear wheel 24 will be transmitted through follow-up means 68 and pivot link 66 about pivot connection 164 to move valve spool 62 to a neutral condition when the desired setting of the control lever has been reached. Also, manual control lever may be moved into notch 79 of control device or front steer actuating lever 78 to thereby cause the rear wheels to steer in synchronization as the front wheels are turned, as will be described later. In the mode of operation, any turning movement of the front wheels 22 set by steering wheel 44 will cause control device or actuating lever 78 to be pivoted about pivot pin 80 and carry with it control lever 60 which in turn will move valve spool 62 a corresponding amount and turn the rear wheels.

According to one aspect of the invention, control lever 60 is of unique construction to allow it to be positively held in selective engagement with either of control devices 78 or 82. The details of the control lever 60 are shown in FIGS. 8 through 10. Control lever 60 includes a first portion 100 having a hub 102 pivoted on fixed shaft 80. Hub 102 is connected through arm 104 and flexible link 64 to link 66, as will be described in more detail later.

Control lever 60 also incorporates a second portion 106 that is pivotally supported on first portion 100 through a pivot pin 108 that defines a pivot axis extending perpendicular to the axis of shaft 80. The upper end of the first portion 100 of lever 60 has a counterbore 110 therein which receives a compression spring or biasing means 112. A ball 114 is also received in the counterbore and engages the free end of sping 112.

The second portion 106 of control lever 60 has a pin 120 extending across an open area defined between the two legs 122 which extend downwardly on opposite sides of the first portion 100 and are carried by the pivot pin 108. The fixed pin is located adjacent the upper end of the first portion. The first portion also has a pair of fingers 124 that define laterally spaced stops for the pin.

The fingers 124, pin 120, ball 114 and spring 112 act as retention means for normally maintaining the two portions 100 and 106 in first and second positions relative to each other wherein the second portion 106 is located in one of the notches 79 or 84 defined in the control devices 78 and 82. An inspection of FIG. 8 reveals that movement of the control lever from the solid to the dotted line position will cause the pin 120 to force the ball downwardly and compress spring 112. When the second portion 106 of lever 60 is in the dotted line position, the compression spring 112 will force the ball 114 upwardly and hold the pin 120 against finger 124. In this position, the control lever is positively held in notch 79 of first control device 78. Thus, it will be seen that the construction of the control lever provides a simple mechanism for positively retaining the control lever in selective engagement with either control device or lever 78 and 82 for conjunctive pivotal movement therewith about the shaft 80.

According to another aspect of the present invention, the link 66 is designed to allow movement of the control lever or the follow-up means without movement of the valve spool. The unique construction of the link 66 is necessary because of the construction of control valve or member 50. Control valve 50 is of the type in which the valve spool 62 is spring biased to a neutral centered position and has a maximum stroke of a small axial dimension, on the order of one-fourth of an inch, in each direction from the neutral position. It will be appreciated that the movement of the control valve lever 60 from one extreme pivoted position to another would require the control valve to be moved more than the maximum stroke that is available for the valve spool. Thus, the link 66 is constructed to normally act as a rigid link during normal operation of the steering system but may automatically be converted to a compound link when the movement of the control lever or the follow-up means necessitates such action.

The details of the control link 66 are shown most clearly in FIGS. 11 through 14. Referring to FIG. 13, it will be noted that link 66 consists of first and second elements 130 and 132 with element 130 being connected by pivot pin 134 to valve spool 62 while the second element 132 is connected to follow-up means by pivot pin 152 and to flexible link 64 by pivot pin 164. First element 130 includes first and second spaced plates 136 (FIG. 14) while second element 132 also consists of first and second spaced plates 138. The lower ends of the first plates 136 are maintained in the desired spaced relationship through spacers 140 located between the respective plates and the valve spool 62 with the spacers encircling pin 134. The upper ends of the plates 136 are spaced by the same dimension through spacer sleeves 142 through which bolts 144 extend. The peripheral surfaces of the two sleeves 142 define first and second transversely spaced pivot pins adjacent the upper end of element 130.

The respective plates 138 defining second element 132 have first and second spaced recesses 146 adjacent the lower ends thereof and the two recesses 146 define first and second spaced pivot axes that are normally maintained in engagement with the pivot pins, defined by sleeves 144, through biasing means that will now be described.

The biasing means consists of a rod 150 that is pivotally supported on pin 152 that defines the pivotal connection for follow-up means 68. The rod extends downwardly between the two pivot pins 143 and passes through opening 154 in a stub shaft 156 that is rotatably supported in openings 158 defined in the respective side plates 136 that form element 130. The lower end of rod 150 extends below the shaft 156 and has a spring or biasing means 160 received thereon. The free end of the rod 150 also receives a nut 162 so that the spring is compressed between the nut 162 and stub shaft 156 to vary the spring forces.

The operation of the unique link 66 will now be described in connection with the manual control of the rear steering system. It will of course be appreciated that the link 66 will likewise operate in the same manner during the automatic control phase of the rear steering system.

Assuming that the control valve is in a neutral position, which is shown in FIG. 11, rotation of control lever 60 in a clockwise direction about fixed shaft 80 (FIG. 1) will cause link 66 to pivot about pin 152 since follow-up means 68 is not in a stationary condition. During this movement, the two elements 130 and 132 will move as a unit since the biasing means or spring 160 will maintain the pivot axes 146 in engagement with pivot pins or sleeves 142. However, should the control lever 60 be moved a greater distance than the amount of movement that is available for valve spool 62, the first or lower element 130 of link 66 can no longer then be pivoted about pivot pin 152. At this point, the increased force applied to the upper or second element 132 will become greater than the force of the spring 160 and will cause the second element to pivot about the right hand pivot pin, as viewed in FIG. 13, and the two elements of the link will assume the position shown in FIG. 13. In this position, the valve spool 62 will be in a position for supplying fluid to cylinders 52 to pivot wheels in a clockwise direction as viewed in FIG. 2. As the wheels pivot clockwise, the followup means 68 will cause the pivot pin 152 to be moved to the right as viewed in FIG. 13. This movement will continue to allow the biasing force of spring 160 to reposition the first and second elements 130 and 132 to the position shown in FIG. 12. Thereafter, continued pivotal movement of the rear wheels will cause the link, including elements 130 and 132, to move as a unit about pivot pin 164 and ultimately return the valve spool 62 to a neutral condition.

Thus, the biasing means or spring 160 and rod 152 cooperating with the two elements 130 and 132 will normally maintain the two elements in a position to move as a single unit or rigid link while the biasing means can automatically accommodate relative movement of the elements when external forces, greater than the force of the biasing means, are applied to one of the elements while the other element is restrained for movement.

In the system so far described, it is desirable that the rear steering system or means will respond positively and accurately when used manually or when conditioned for automatic synchronization with the front wheels. Thus, it would be desirable to have fixed links between the various components so that any motion produced in one of the components will automatically be transmitted to the other component. However, because of the location of the various components, such a linkage system would be extremely costly and would also require extensive maintenance and repair. It will be appreciated that any excessive wear resulting in the linkage system or any leakage in the fluid system as well as variations in the spring forces that hold the valve spool in the neutral condition are all variables that prevent positive and accurate response of the rear wheels to either the manual control mode or the automatic control mode of operation.

Therefore, according to a further aspect of the invention, the motion transmitting mechanism utilized for the transmission of turning movement from the front wheel to the control lever and the transmission of the motion of the lever and the follow-up means to the control valve all incorporate unique flexible cable means that are not subjected to the variables mentioned above. Each coupling (1) between the front wheel and the control lever, (2) the control lever and the control valve, and (3) the follow-up means between the rear wheel and the control valve is designed to automatically compensate for the variables discussed above.

For this purpose, each of the coupling means 64, 68, and 76 consists of a flexible cable that is constantly maintained under tension and is slidably supported in a sheath connected to a fixed support. For example, the flexible link 64 between control lever 60 and link 66 (FIGS. 1 and 11) consists of cable 170 that is slidably supported in a sheath 172, one end of which is fixedly secured to a bracket 174 adjacent control member 50 and link 66 and the opposite end is secured to a fixed bracket 176 adjacent control lever 60. The cable 170 is slidably supported for axial movement within the sheath 172 and, as explained above, has one end secured to arm 104 forming part of control lever 102 while the opposite end of cable 170 is connected through pin 164 to link 66.

A first spring 180 (FIG. 11) has one end engaging the fixed support 174 while the opposite end is in engagement with a washer 182 carried by cable 170. Likewise, the opposite end of cable 170 is tensioned by a second spring 184 (FIG. 1) interposed between bracket 176 and cable 170. With this arrangement, the cable 170 is constantly maintained under tension so that any movement of the control lever is accurately reflected in a corresponding movement of the link 66.

Likewise, the follow-up means 68 consists of a cable 190 having one end connected to pivot pin 152 while the opposite end is directly connected to a motion transmitting member 72 identical to the motion transmitting member cooperating with the front wheel, both of which will be described later. Again, the follow-up means includes a sheath 192 that is fixed at one end on a bracket 194 located adjacent the rear wheel 20 and at its opposite end on bracket 174 adjacent control valve 50.

The motion transmitting means or coupling 76 between a front wheel 22 and the steering lever or control device 78 includes a flexible cable 195 enclosed in a sheath 196 with the sheath being fixedly secured at one end to bracket 176 and the opposite end to a bracket 197 carried by the frame structure 34 for the vehicle. With this arrangement, all of the cables are constantly maintained under tension and a single cable may be utilized as the motion transmitting means between two remotely located components.

Another problem encountered in the steering system described above is the differential turning angle of the respective wheels when they are turned in opposite extreme positions from the straight ahead position. For example, in order to have all of the wheels rotating about a common center, the outside wheels must be turned to an angle that is slightly less than the inside wheel while the reverse is true when the wheels are turned in the opposite direction. This is true of both sets of steered wheels when the vehicle is conditioned for cramp steering.

Thus, according to a further aspect of the invention, the connection between the cables 190 and 195 and the motion transmitting members 72 is such that the cable is moved an equal longitudinal dimension for each maximum extreme angular position of the associated wheel on opposite sides of the straight ahead position even though the two angular positions are different.

The details of this mechanism will be described in connection with the front wheel 22, front motion transmitting mechanism 72 and cable 195, with the understanding that the connection between cable 190 and the rear motion transmitting means 72 will be identical.

Referring to FIG. 15, it will be noted that motion transmitting means 72 consists of a plate 200 that is fixed to the vertical pivot pin 74. The flexible cable 195 is connected to plate 200 at a pivotal connection 202 that is specifically located in a manner that will produce equal longitudinal movement of the cable in opposite directions from an intermediate position as the front wheel 22 is turned to two extreme positions, which are of different angles.

In the straight ahead position for the front wheel, the pivot pin 202 will be located on the inside of a plane passing through the pivot axis defined by pin 74 and extending parallel to the longitudinal center of the vehicle. This plane is identified by the reference numeral 204 and the angle between a second plane 206 that extends through the center of vertical pin 74 and pivot pin 202 when the vehicle is in a straight ahead condition is identified by the angle A. During the movement of the wheel 22 to either extreme position, from the straight ahead position, the pivotal connection 202 will be moving along an arc identified by the reference numeral 208, which has its center aligned with the axis for vertical pin or king pin 74. When the left wheel is turning to the left, as viewed in FIG. 2, the pivotal connection will be moved a greater angular distance than when the left wheel is turned to the right to the respective extreme positions. These two angular positions are respectively shown as angles B and C. However, it will be noted that the pivot pin or connection 202 will move an equal amount identified respectively by the reference numeral D as the pivot pin is moved to the two extreme angular positions corresponding to the maximum positions of travel for the opposite extreme positions.

The particular connection will insure that the control lever 60 is moved an equal amount when the system is conditioned for automatic operation. The same conditions will occur when the rear wheel is turning in the opposite direction or when the system is conditioned for manual operation.

Operation

It is believed that the operation of the steering system in either the manual or automatic mode will be understood from the above description but a brief summary appears to be in order.

Figure 6:
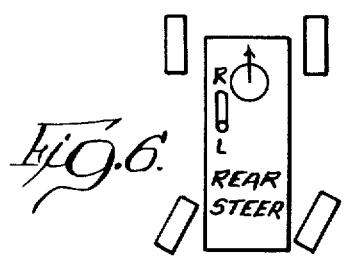
Figure 7:
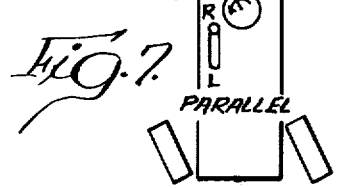

If it is desired to operate the vehicle by manually controlling the rear and front wheels separately, the manual control lever 60 is moved to the dotted line position of FIGS. 1 and 10 wherein the second portion 106 is in engagement with notch 84 on second control device 82. In this position, the rear control steering system 30 is completely separated from the front control system 28 and both sets of wheels can be individually controlled to produce conditions such as shown in FIGS. 6 and 7. For example, the rear wheels can be turned to either extreme position while the front wheels are in the straight ahead position as shown in FIG. 6. This condition might be desirable when the vehicle is being moved in reverse direction and it becomes desirable or necessary to accurately control the direction and/or position of the vehicle. Also, in the manual condition, which also may be incorporated into an automatic condition, the two sets of wheels may be individually controlled to have the vehicle operating in a condition shown in FIG. 7, wherein the longitudinal axis of the vehicle is moved at an angle with respect to the forward directional movement of the vehicle.

In any of the conditions just described, the manual control lever may be set at any desired angle with respect to a neutral position and the setting will be maintained by the friction means cooperating with the second control device. Thus, assuming that the rear wheels were to be turned to the maximum extreme position shown in FIG. 6, the control lever 60 would be moved to a maximum counter-clockwise position with respect to shaft 80 which would operate control member or valve spool 62 to supply fluid to cylinders 52 and pivot the wheel clockwise, as viewed in FIG. 2. This movement would be transmitted by the follow-up means 68 to link 66 and automatically return the valve spool to the neutral condition when the angular setting, set by the control lever 60 has been reached by the rear wheels.

Figure 4:
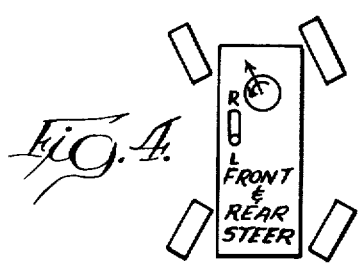
Figure 5:
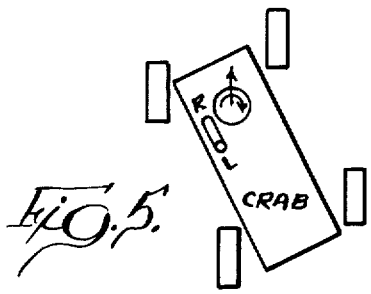

The same condition can also be achieved automatically in synchronized relation to the steering of the front wheel in either a cramp steering or crab steering condition, respectively shown in FIGS. 4 and 5. For example, if cramp steering such as shown in FIG. 4, were desired, the manual control lever would be moved into engagement with the first control device 78 while the front and rear wheels were in the straight ahead condition. Thus, as the front wheels are turned by the steering wheel 44, the rear wheels would automatically turn at an equal and opposite angle by motion transmitted through the signal transmitting means 76, control device 78, control lever 60, flexible link 64 and compound link 66 to automatically actuate the valve spool 62 and turn the rear wheels. When the rear wheels reach the angular position corresponding to the position of the front wheels, the follow-up means 68 automatically neutralizes the control valve.

The same condition occurs when the vehicle has been conditioned for crab steering such as shown in FIG. 5.

It will be appreciated from the above description that the hydraulic control steering system described above provides for the flexibility of manual or automatic control of the rear wheels at the discretion of the operator.

Modified Form Of Transmitting Means

FIG. 16 shows a slightly modified form of the invention wherein the control valve or member 50 is located adjacent the operator's compartment of the vehicle and the signal transmitting means 76 and follow-up means 68 have been modified while the flexible linkage means 64 is replaced with a rigid link. Since many of the elements of the modified form of the invention are identical in construction to the embodiment shown in FIGS. 1 through 15, only the differences will be described.

In the modified form of the invention, flexible link 64 is replaced with a rigid link 300 that has one end connected to arm 104 while the opposite end is connected to the second element 132 of link 66. Also, in the modified form of the invention, the signal transmitting means 76 from the front wheels 22 to the control device or front steering lever 78 has been modified and includes a flexible cable 302 leading from each of the front wheels 22. The flexible cables 302 respectively are enclosed in sheaths 304 that are fixed at end brackets 197 while the opposite ends are fixed to a bracket 310 adjacent the operator's compartment of the vehicle. The opposite ends of the respective cables 302 are connected to outer ends of an arm 312 that is fixedly secured intermediate its ends to the front steering lever or control device 78.

With this arrangement, turning movement of the front wheels in one direction will be transmitted through one cable 302 to the front steering lever 78 while the turning movement in the other direction will be transmitted with the other cable 302.

The same arrangement is incorporated into the follow-up means wherein first and second cables 314 each have one end connected to the rear wheels and are enclosed in sheaths 316 for axial movement therein. One end of each of the sheaths 316 is fixed to support bracket 197 adjacent each of the rear wheels while the forward ends of the sheaths are fixedly secured to extension 316 on bracket 310. The opposite ends of the respective cables 314 are connected to a lever 318 that is pivoted intermediate its end on bracket 310 through a sleeve 320. The sleeve 320 has an arm 322 that is connected to an intermediate portion of link 66 through a further rigid link 326. Again, the turning movement in opposite directions of the respective rear wheels is transmitted through the respective cables 314, to arm 322 through link 326 to the compound link 66 and control valve 62.

Since the modified form of the invention is substantially identical in operation as that described above, a detailed description thereof does not appear to be necessary.

In both embodiments of the invention, the various components are arranged in such a manner that a minimum number of movable parts is required and the steering control of the rear wheels of the vehicle may be optionally produced as a direct function and in synchronization with the front wheels or completely independent at the discretion of the operator through the manipulation of a single control lever that is positioned for ready accessibility to the operators in the operating compartment of the vehicle.

I claim:

1. A steering system for a vehicle including front and rear wheels, comprising first means including a steering wheel for controlling the turning movement of said front wheels; second means for controlling the turning movement of said rear wheels, said second means including a valve having a valve spool movable in opposite directions from a neutral position to cause said rear wheels to turn, said spool having extreme operative positions; a link connected to said spool and pivot means for said link adjacent said spool; a lever; connecting means between said link and said lever for manually actuating said valve spool by said lever independent of said front wheels setting a desired angular position of said rear wheels; and third means cooperating with said front wheels and selectively engageable with said lever to operate said rear wheels in any one of a plurality of modes of operation, said third means, when engaged with said lever, actuating said valve spool as a function of the turning movement of said front wheels, said link including first and second elongated elements respectively connected to said spool and said connecting means; and means between said elements (1) normally causing said elements to move as a unit and (2) accommodating relative movement of said elements when said spool is at a maximum extreme operative position and an external force is applied to said link by said connecting means.

2. A steering system as defined in claim 1, further including follow-up means connected to said pivot means and said rear wheels to move said pivot means as a function of the position of said rear wheels and return said spool to a neutral position when said rear wheels are in a position corresponding to the position set by said lever.

3. A steering system as defined in claim 2, in which said follow-up means includes a flexible cable having one end connected to said rear wheel and the opposite end connected to said link and a sheath connected to a fixed support adjacent said link and said rear wheel; and in which said connection means between said lever and link includes a sheath having opposite ends respectively connected to the fixed support with a cable slidable in said sheath and having opposite ends connected to said link and said lever, and tension means cooperating with said cables for constantly maintaining said cables under tension.

4. A steering system for a vehicle including front and rear wheels, comprising first means including a steering wheel for controlling the turning movement of said front wheels; second means for controlling the turning movement of said rear wheels, said second means including a control member movable in opposite directions from a neutral position to cause said rear wheels to turn; a lever cooperating with said control member for manually actuating control member and setting a desired angular position of said rear wheels; and third means cooperating with said front wheels and selectively engageable with said lever for actuating said control member as a function of the turning movement of said front wheels, said lever being pivoted about a fixed axis and said third means including a control device pivoted about said fixed axis adjacent one side of said lever, said control device having a notch for receiving said lever and cable means connecting said control device to said front wheel.

5. A steering system as defined in claim 4, in which said second means includes a second control device pivoted about said fixed axis on the opposite side of said lever, said second control device having a notch for receiving said lever; and friction means cooperating with said second control device for maintaining said lever and second control device in adjusted positions.

6. A steering system as defined in claim 5, in which said lever includes a first portion pivoted on said fixed axis and a second portion pivoted on said first portion about an axis extending perpendicular to said fixed axis; and retention means between said first and second portion for maintaining said second portion in first and second pivoted positions relative to said first portion, said respective positions placing said second portion in the respective notches of said control devices for conjunctive movement therewith.

7. A steering system for a vehicle including front and rear wheels, comprising first means including a steering wheel for controlling the turning movement of said front wheels, second means for controlling the turning movement of said rear wheels, said second means including a control member movable in opposite directions from a neutral position to cause said rear wheels to turn; a lever cooperating with said control member for manually actuating said control member and setting a desired angular position of said rear wheels; and third means cooperating with said front wheels and selectively engageable with said lever for actuating said control member as a function of the turning movement of said front wheels, said second means including a cable between said control member and said lever and a sheath fixed at opposite ends and slidably supporting said cable; said third means including a control device pivoted adjacent said lever, a further flexible cable connecting said control device to said front wheel and a further sheath fixed at opposite ends for slidably supporting said further cable, and tension means cooperating with said cables for contantly maintaining said cables under tension.

8. A steering system as defined in claim 7, further incuding a third cable connecting said rear wheel to said control device; and a third sheath fixed at opposite ends and slidably supporting said third cable and tension means for constantly maintaining said third cable under tension.

9. A hydraulic steering system for a vehicle including first and second steered wheels, comprising first hydraulic means having a manual steering member incorporated therein for controlling the turning movement of said first wheel; second hydraulic means including value means for controlling the turning movement of said second steered wheel; linkage means between said first steered wheel and said valve means, said linkage means including a lever pivoted about a fixed pivot and operable to condition said linkage means for (1) direct actuation of said valve means by said lever independently of the turning movement of said first steered wheel and (2) actuation of said valve means in. response to turning movement of said first steered wheel, said linkage means further including a control device pivoted on said fixed pivot axis adjacent said lever, a first sheath having opposite ends fixed to said vehicle, a first cable slidable in said sheath and having opposite ends cooperating with said first steered wheel and said control device, a second sheath fixed at opposite ends on said vehicle, a second cable slidable in said second sheath and having one end connected to said lever and an opposite end cooperating with said valve means, and tension means cooperating with said cables to maintain said cables under tension; and follow-up means between said second steered wheel and said linkage means for returning said valve means to a neutral position when said second steered wheel reaches angular orientation corresponding to the angular orientation of said first steered wheel.

10. A hydraulic steering system as defined in claim 9, in which said linkage means further includes a link having opposite ends respectively pivotally connected to said valve means and said second cable and in which said follow-up means includes a third sheath fixed at opposite ends to said vehicle and a third cable slidable in said third sheath, said third cable having one end cooperating with said second steered wheel, said third cable having its opposite end connected to said link intermediate said second cable and said valve means connections, and tension means cooperating with said third cable for constantly maintaining said third cable under tension.

11. A hydraulic steering system as defind in claim 10, in which said link includes first and second link elements with said valve means connected to one of link elements and said cables connected to the other of said link elements, and means interconnecting said link elements to normally cause said elements to move as a unit, said last means accommodating relative movement of said link elements when said valve means is in an extreme operative position and one of said cables is moved in a direction to produce further movement of said valve means.

12. A hydraulic steering system for a vehicle including a first and second steered wheels, comprising first hydraulic means having a manual steering member incorporated therein for controlling the turning movement of said first wheel; second hydraulic means including valve means for controlling the turning movement of said second steered wheel; and linkage means between said first steered wheel and said valve means, said linkage means including a lever pivoted about a fixed pivot and operable to condition said linkage means for (1) direct actuation of said valve means by said lever independently of the turning movement of said first steered wheel and (2) actuation of said valve means in response to turning movement of said first steered wheel, said linkage means further including a second control device pivoted on said fixed pivot on the opposite side of the lever, said lever having a first position axially of said fixed axis for engaging and moving with the first control device and a second position engaging said second control device for manually moving said valve means; and friction means cooperating with said second control device to hold said lever in manually adjusted position.

* * * * *